Nov. 5, 1929.                L. LEVY                1,734,038
                 ELECTRICAL TRANSMISSION OF ENERGY
                   Filed Aug. 12, 1918      6 Sheets-Sheet 1

Inventor:
Lucien Levy
per H. W. Plucker
Attorney.

Nov. 5, 1929.　　　　　L. LEVY　　　　　1,734,038
ELECTRICAL TRANSMISSION OF ENERGY
Filed Aug. 12, 1918　　　6 Sheets-Sheet 5

INVENTOR.
Lucien Levy
BY
ATTORNEY

Fig. 12

Patented Nov. 5, 1929

1,734,038

UNITED STATES PATENT OFFICE

LUCIEN LEVY, OF PARIS, FRANCE, ASSIGNOR, BY MESNE ASSIGNMENTS, TO AMERICAN TELEPHONE AND TELEGRAPH COMPANY, A CORPORATION OF NEW YORK

ELECTRICAL TRANSMISSION OF ENERGY

Application filed August 12, 1918, Serial No. 249,572, and in France August 4, 1917.

(GRANTED UNDER THE PROVISIONS OF THE ACT OF MARCH 3, 1921, 41 STAT. L., 1313)

An application for this invention was filed in France, August 4, 1917.

Radio telegraphic transmission, which, at the present time, has numerous advantages over transmission by wires or cables, particularly for great distances, presents also, certain disadvantages which limit the applications of it.

Among the principal ones well known to radio telegraphists must be mentioned atmospheric disturbances, confusions between the different signals, and the lack of secrecy. With the continual increase of the distances between the transmitting stations and receiving stations, and the number of transmitting stations, the appliances at present employed do not permit of sufficiently assured communications between two distant stations owing to the interferences of atmospheric currents and of other stations with the transmission to be received.

The receiving apparatus at present in use consists of (1) A primary selecting apparatus, preceded or followed sometimes by amplifying appliances, and which is based upon electrical phenomena which are well known and which utilize the differences of frequency of the waves emitted by the different stations.

(2) A detecting apparatus which converts the high frequency oscillations into currents of low frequency capable of actuating the telephones and other receiving apparatus after amplification if necessary.

The disadvantages of these appliances when used alone are first,

The insufficiency of the selection which permits of hearing the stations working with a frequency approaching that it is desired to receive, and second The mixture in the circuit of the detector in which the telephone is placed of the low frequency currents proceeding from the radio telegraphic transmitting stations with low frequency currents due to atmospheric disturbances. Attempts have been made hitherto to combine electrical circuits or acoustical appliances permitting of a second selection based upon the differences between the said low frequencies so as to put in evidence the signals issuing from the receiving station, but these appliances have not been capable of any satisfactory result notably because the differences existing between these frequencies are too small.

The object of the invention is to allow of a secondary selection which is absolutely efficacious and which completely avoids all confusions likely to arise from foreign transmissions and from atmospheric currents. The present invention likewise is capable of effecting in place of a single secondary selection a great number of successive selections, but, in the present state of wireless telegraphy, a double selection is generally sufficient.

The method which forms the subject matter of the present invention consists broadly, First, in producing in the receiving circuit under the action of the transmitting circuits, and in certain cases, by the co-operation of local auxiliary circuits, an alternating current of high frequency modulated in amplitude, that is to say an alternating current of high frequency the amplitudes of the successive periods of which increase and decrease periodically with an ultra-acoustical frequency that is one which is inaudible and which may be called the secondary frequency.

Second, in utilizing for reception the very great difference of frequency between the modulation, or secondary frequency current and that of the currents of low frequency produced by the atmospheric currents and by the stations working with the ordinary appliances.

The production of the alternating current of high frequency modulated in amplitude in the primary selecting circuit of the receiving station is obtained;

(a) By the emission at the transmitting station either of currents modulated in amplitude like that of the receiving station which has just been mentioned, but much more powerful, or of high frequency currents modulated in frequency, or (b) By appliances which utilize the phenomena of high frequency beats at one of the two transmitting stations or receiving stations between two currents of high frequency. The utilization of the differences of frequency between the modulated current, i. e. the secondary frequency, and the currents of low frequency produced by the atmospheric disturbances or strays and the stations working with the ordinary appliances is effected by the addition to the present selecting and primary detecting appliances, of secondary selecting and detecting appliances the working of which is likewise based on the phenomena of electrical resonance.

The secondary detecting appliance is generally combined with a ticker or with a local source of sustained waves tuned to a frequency which is slightly different from that of the secondary frequency derived from the high frequency of emission so as to obtain a current of audible frequency capable of working the telephone and other receiving apparatus.

The use of the ticker and of the locally generated currents are however useless when the secondary frequency is itself modulated by a low or audible frequency either in amplitude or in frequency, as in the case of wireless telephony, in particular.

The accompanying drawing shews, for example an installation which permits of the carrying out of the present method.

Figure 7 shews the installation of the receiving station.

Figures 7ª, 8, 9 and 9ª are modifications of details at this receiving station.

As shewn in Figure 1, the transmitting station is constituted in the following way:

A vacuum tube 1 mounted as a generator of oscillations is coupled to an antenna according to the known methods, and is subjected to the action of a modulating tube 2 likewise mounted as a generator of waves but of a frequency lower than emitted from tube 1.

The vacuum tube 1 is constituted by a bulb in which a vacuum has been created and which contains a hot filament 3, a grid 4 and a plate 5.

The filament 3 is connected to the grid 4 by a self induction coil 6 shunted by the condenser 7 and by a self induction coil 8 on the one hand, and on the other hand to the plate 5 by a circuit passing through the self induction coil 9 shunted by the condenser 10 and through the battery 11.

The self induction coil 8 is coupled magnetically to the self induction coil 9 according to the known method of connection.

The antenna 12 is connected to a point $a$ of the self induction coil 9 and to earth at the point $b$ of this latter.

The vacuum tube 2 is mounted in a manner similar to that of the vacuum tube 1; its hot filament 13 is connected on the one hand to the grid 14 by a circuit passing through a self induction coil 15, constituting the secondary of a transformer 16, shunted by the condenser 17 and a self induction coil 18 and on the other hand to the plate 19 by a circuit passing through the self induction coils 20 and 21 shunted by the condenser 22, and through the battery 23.

The self induction coils 21 and 20 are coupled magnetically to the self induction coils 18 and 6 respectively.

The primary circuit of the transformer 16 is in series with the microphone 24 and a battery 25.

It is to be noted that the tube 2 may be and preferably is of less power than the tube 1 since it controls the energy output of the latter by affecting the oscillations in its grid circuit.

It is well known that the magnetic coupling between the grid circuit 3, 8, 4 and the plate circuit 3, 9, 5 produces sustained oscillations at a frequency which closely approaches that of high frequency oscillating circuit 9, 10.

In like manner the oscillations of the natural frequency of tuned circuit 21, 20, 22 develop in this latter circuit.

It should be noted that in this appliance the microphonic variation is no longer applied to the modulation of the waves emitted by the vacuum tube 1, as in the known systems, but to the modulation of alternating currents generated by the working of the vacuum tube 2 oscillating at a high frequency which however is lower than that of the transmitter tube 1.

It should also be noted that the oscillations produced by the transmitting vacuum tube 1 are modulated at high frequency (referred to above as the secondary frequency) by the coupling of the oscillatory circuit 21, 20, 22 with the circuit 6, 7 preferably tuned to the frequency of circuit 21, 20, 22 and placed in series with the coil 8 in the grid circuit.

Figure 2:
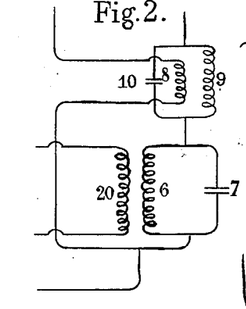
Figures 2, 2ª and 3 shew modifications of details at the transmitting station.

This modulation might likewise be effected by putting the system 6, 7 in series in the plate circuit as indicated in Figure 2.

The vacuum tube 1 may be replaced by a group of vacuum tubes which are identical with 2 and of which the grids and plates are connected with each other respectively the filaments being heated in parallel by the same source without changing the spirit of the invention.

Figures 2A, 7, 8:
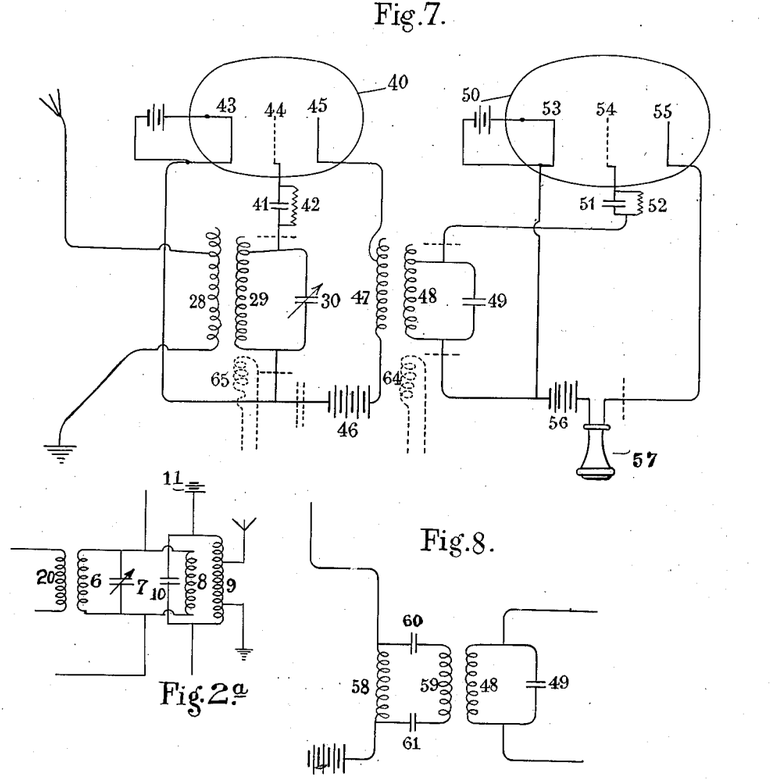

In like manner it is possible to arrange in parallel instead of in series the circuits by which the modulation is effected and the circuits by which the plate voltages are applied to the grids to produce the oscillations, as shown, for example, in Figure 2ª.

Working

Under the action of the variations of the primary current due to the microphone 24, there are developed in the secondary 15 of the transformer 16 alternating voltages of low frequency the effect of which is to cause the energy of the secondary frequency current oscillating in the circuit 21, 20, 22 to vary. Under the effect of this current, in consequence of the coupling of the coils 20 and 6 there is produced, as in the case of the tube 2, variations of the energy of the current of high frequency oscillations in the circuit 9, 10; these variations being of the secondary but super-audible frequency and creating in the circuit 9, 10 and in the antenna connected to this circuit variations of the energy of the current passing through the antenna at this secondary frequency.

Figure 4:
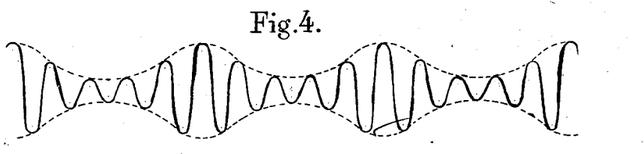
Figures 4, 5 and 6 are diagrammatic views which shew respectively currents of high frequency modulated in variable amplitude, or variable frequency, or variable frequency and amplitude.
Figure 5:
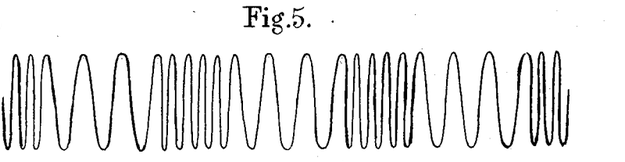
Figure 6:
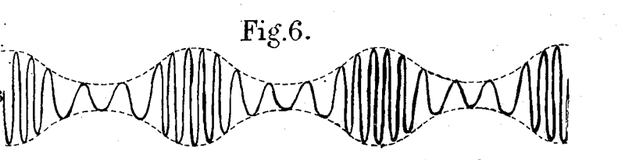

In consequence of this arrangement the amplitude or the frequency or both of the waves emitted by the antenna are variable periodically as shewn in Figures 4, 5 and 6. This modulation at secondary frequency of the current emitted by the antenna is itself modulated at low frequency under the influence of the microphonic currents.

Figure 3:
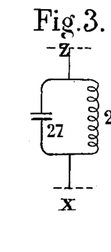

It is of advantage to introduce at $x$, $z$ an oscillating circuit 26, 27, (Figure 3) tuned to the secondary frequency which transforms the current of that frequency in the plate circuit into variations of voltage these variations acting in a more intense manner to modulate the energy emitted by the antenna.

Figure 10:
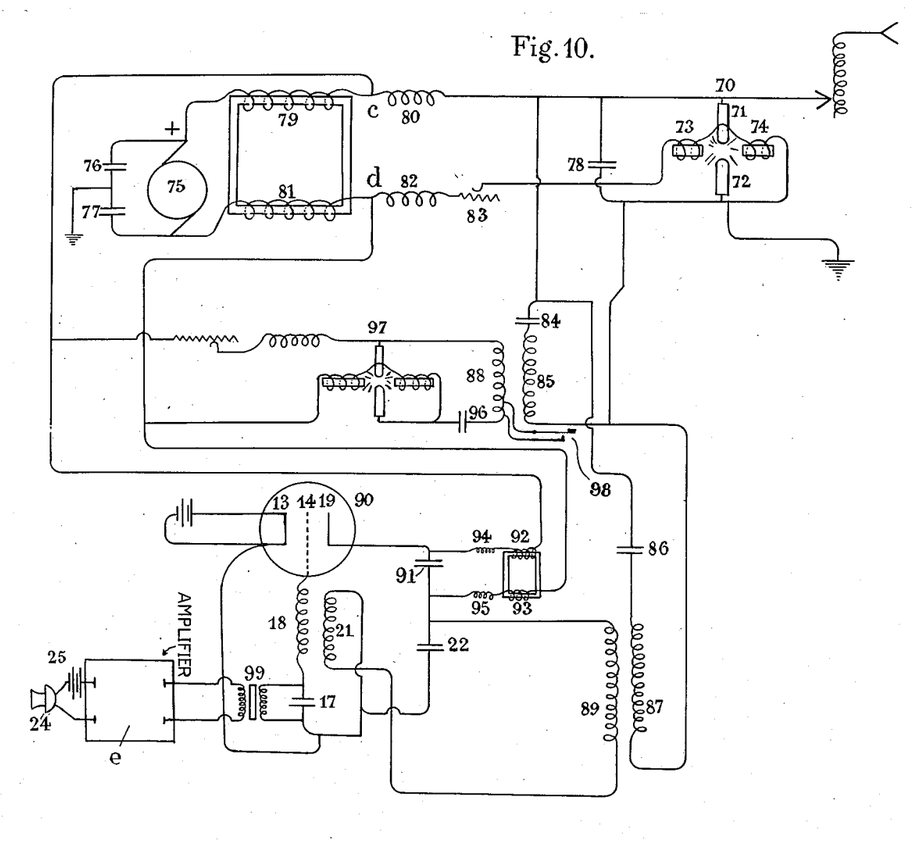
Figure 10 shews a modification of the transmitting station, in which use is made of an arc in place of a vacuum tube as emitter of sustained waves.

If in place of a radio telephonic transmission a radio telegraphic transmission is desired, the transformer 16 does not play any part, and the telegraphic manipulation will be effected for example by means of a key, varying the frequency of the circuit 21, or 20, so as to vary the frequency and intensity of the secondary frequency modulating the waves emitted, as shown in Fig. 10 hereinafter described.

Figure 7 shews the receiving apparatus of a radio station with double selection constructed according to the present invention. In this arrangement use is made of vacuum tubes as detectors, but these may be replaced by all systems of detectors used in wireless telegraphy although the use of vacuum tubes offers various advantages.

This arrangement comprises a receiver for example comprising, the coils 28, 29 and the capacity 30 and a detector constituted for example by a vacuum tube 40. The secondary 29, 30 is mounted in series with the capacity 41 shunted by the resistance 42 in the grid circuit 43, 44; the value of 41 and of 42 must be such that the time constant of the grid circuit corresponds practically to the secondary frequency modulating the frequency of emission at the sending station.

In the filament plate circuit 45, 43 are mounted in series the battery 46 and the self induction coil 47.

This latter is coupled to the oscillating circuit 48, 49 provided with a detector which is preferably a vacuum tube 50 and mounted in series in the grid circuit of this latter is the capacity 51 with the resistance shunt 52.

In the filament plate circuit 53, 55 are mounted in series the battery 56 and the receiving telephone 57.

The oscillating circuit 48, 49 is tuned to the secondary frequency which is used for modulation of the high frequency at the transmission end, that is to say to the frequency of the circuit 21, 20, 22 of the transmitting station and consequently to a frequency lower than that of the receiving secondary circuit 29, 30 which is tuned to the high frequency of the transmitting circuit 9, 10.

The working of this receiving apparatus is as follows:—

The primary selection is produced by the selecting circuit 29, 30 which, under the influence of the oscillations of the receiving antenna is traversed on the one hand by a current of high frequency modulated by the secondary frequency derived from a transmitting station previously described and on the other hand by the ordinary high frequency currents issuing from stations emitting on the same wave length.

The currents detected by the vacuum tube 40 entering the plate circuit 43, 47, 45 are, (1) low frequency currents arising from atmospheric currents, from spark stations; from stations of sustained waves such as are received by the heterodyne method of the usual kind, and (2) high frequency currents modulated at the secondary frequency issuing from the radio transmitting station above described. These currents, the frequency of which is lower than the frequency of the waves received by the antenna but higher than the frequency of other received waves after detection, are selected by the secondary selection circuit 48, 49 the use of which in connection with the first detection constitutes a characteristic of the invention.

By virtue of this selective effect the circuit 48, 49 is traversed solely by the currents issuing from the transmitting radio station herein described which alone give into the self induction coil 47 a secondary frequency current capable of exciting oscillations in 48, 49.

This current is detected by the tube 50 the plate circuit of which is traversed by currents at the frequency used to modulate the secondary frequency of the circuit 48, 49; that is to say of acoustical frequency, and the telephone reproduces the words pronounced in front of the microphone.

For the purpose of effectively separating, after the first detection, the extraneous low frequency currents from the secondary frequency currents there may be interposed between the primary and secondary selecting and detecting circuits a filtering circuit which allows only the secondary frequency currents to pass. In this case the self induction coil 47 is replaced by a coil 58 (see Figure 8) of high self induction and low distributed capacity. The two terminals of this latter are connected to the terminals of a self induction coil 59, with the interposition of capacities 60, 61 of low value. This coil 59 is coupled to the coil 48 of the secondary selecting circuit as has been previously explained.

Figure 9:
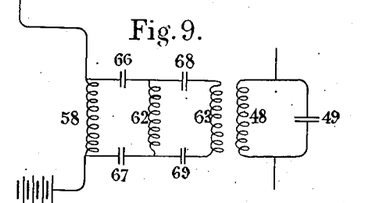

There may be likewise mounted in the same way as shown in Figure 9 a succession of coils 62, 63 with the interposition of capacities 66, 67, 68, 69 for the purpose of obtaining a more complete filtration of the high frequency currents.

Figure 7A:
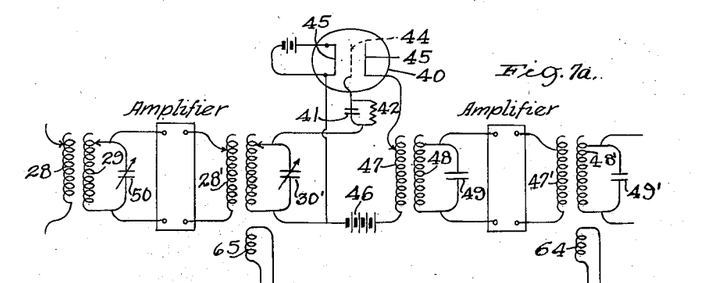

Appliances amplifying the high frequency currents and themselves having or not selecting circuits tuned respectively to the circuits 29, 30 and 48, 49 might be interposed between the said circuits and the detectors without changing the spirit of the invention. This is shown, for example, in Figure 7ª where the amplifier is interposed at the point indicated in Figure 7 by the dotted lines between the selecting circuit 48, 49 and the detector 50. This also illustrates equally well the manner of introducing the amplifier between the selecting circuit 29, 30 and the detector 40 at the point indicated by dotted lines, where it may likewise be used if it is desired and the frequencies are suitable for amplification. The additional selecting circuit, which may or may not be used, is indicated at 48', 49'.

Figure 9A:
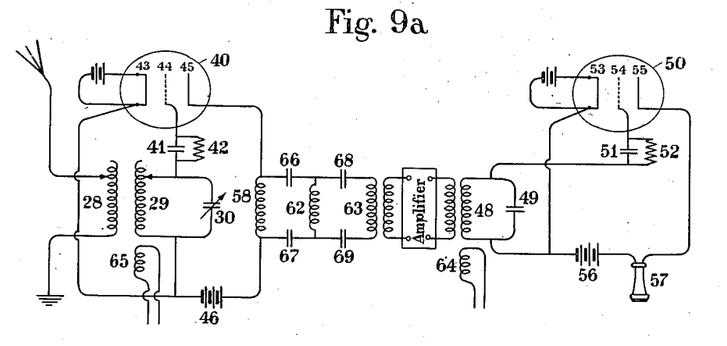

Amplifiers may also be used for amplifying the secondary or intermediate frequency by interposing them between the filter circuit (Fig. 9) in the output circuit of the first detector and the secondary selecting circuit 48, 49 in the input circuit of the second detector, as shown in Figure 9ª.

In the case of a radio telegraphic transmission where the secondary frequency is not modulated at low frequency as in the case of radio telephonic transmission, a coil 64 traversed by a current of a frequency approaching that of 48, 49 is coupled magnetically to 48 so as to obtain beats of audible frequency with the current of the secondary frequency which circulates in 48, 49.

In place of using vacuum tubes as sustained wave emitters, use may be made of an arc of the Poulsen kind and the auxiliary generator may likewise be an arc or a vacuum tube.

Figure 10 shews an example of the application of the present system to transmitting stations using arcs. There are two transmission channels which may be used simultaneously, one radio telegraphic and the other radio-telephonic, and both are so arranged as to facilitate double selection at the receiving end.

An arc 70 of the Poulsen or other kind serving for the emission of sustained waves according to the known method is in series in the antenna, 71 being the anode and 72 the cathode 73, and 74 are the electromagnets.

The machine 75 protected against the supertensions of high and low frequency by the condensers 76 and 77 placed in shunt between its terminals, charges the condenser 78 placed in parallel with the arc the positive pole of the machine being connected to the anode by the iron self induction coil 79, the choke coil 80 and the negative pole being connected to the cathode, through the iron self-induction coil 81, the choke coil 82, the rheostat 83 and the coil of the electromagnets 73 and 74.

In parallel with the arc are arranged the circuits 84, 85 and 86, 87 of which the self-induction coils 85 and 87 are coupled magnetically respectively to 88 and 89. The self induction coil 89 is traversed by the high frequency currents arising from the oscillation of a vacuum tube 90 mounted like tube 2 in Figure 1.

The battery 23 is replaced by a condenser 91 charged by the machine 75 through two iron cored coils 92, 93 and two choke coils 94, 95, the oscillations of the plate circuit passing through the condenser 91. The self induction coil 85 is traversed by the oscillations developed in the circuit 88, 96 by the action of the auxiliary arc 97 of lower power and frequency than 70, according to the known methods.

The arc 97 and the tube 90 are supplied by the same machine as the arc 70, a continuous shunt current from the said machine being taken between the points $c$ and $d$.

The condensers 84 and 86 have values such that they annul the self induction of the self induction coils 85 and 87 respectively for the frequencies of the currents above indicated which circulate in 88 and 89 and prevent the short circuiting of the continuous source.

Under these conditions the action of the principal arc 70 which emits the oscillations is variable at high frequency, and the modulation by the secondary frequency takes place under the action of the potential differences developed at the terminals of 85 and 87 by the induction of the coupled coils 88 and 89, the intensity of the currents produced by these potential differences being further reinforced by the effect of the principal arc owing to the properties of negative resistance of the arc. As previously, the periods of these currents produced by the auxiliary arc and the tube 90 are of lower frequency than that to which the antenna is tuned, and they are different from each other.

The telegraphic manipulation is carried out for example by short circuiting by means of the manipulator 98 some turns of 88 so as to vary the frequency of modulation of the emission of the arc 70, which modulation is due to the auxiliary arc 97.

Figure 1:
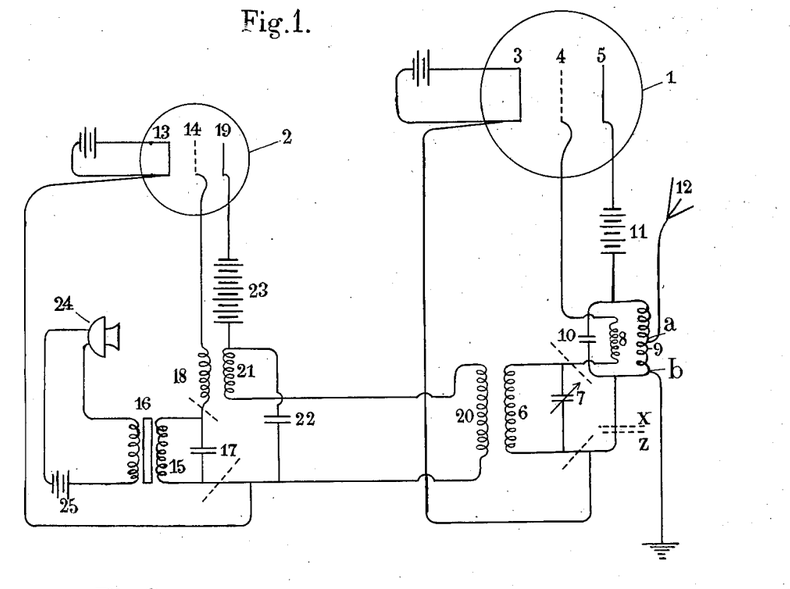
Figure 1 shews the installation of the transmitting station.

The microphonic currents amplified by an amplifying apparatus of the known kind e pass through the primary of the transformer 99 and modulate as in the case of Figure 1, the amplitude of the currents of the vacuum tube 90 traversing the coil 89 and modulating the energy emitted by the principal arc 70 as has been described above.

Figure 11:
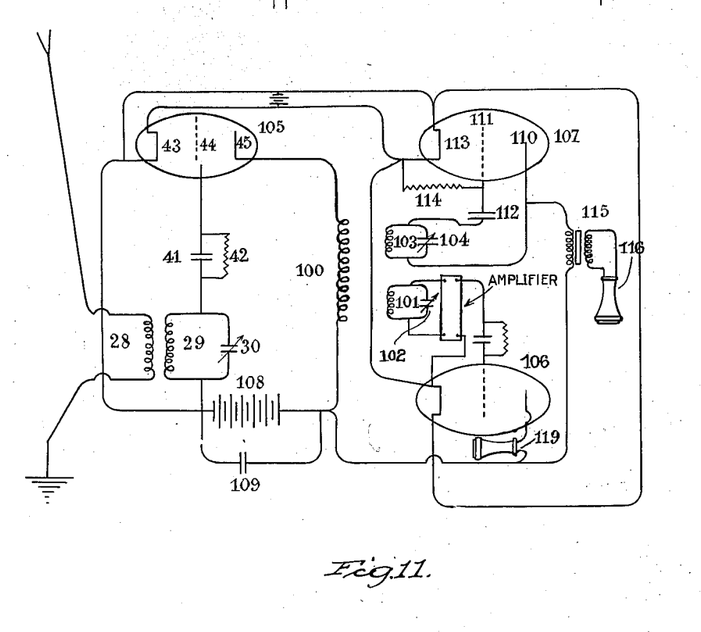
Figure 11 shews the receiving station installed for the reception of transmissions emitted by the transmitting station shewn in Figure 10.

Figure 11 shews by way of example the simultaneous reception of the radio telegraphic transmissions and radio-telephonic transmissions emitted by the transmitting apparatus shewn in Figure 10.

The whole of the primary selecting and detecting circuits is constituted as in the case of Figure 7, but the self induction coil 100 is coupled magnetically to the self induction coils 101 and 103 of the two secondary selecting circuits 101, 102, and 103, 104 provided respectively with their detectors constituted by vacuum tubes 106, 107 as has been previously described.

The vacuum tubes 105, 106, 107 have their filaments heated in parallel and utilize the same battery 108 common to the three plate circuits and shunted by the condenser 109.

The tube 106 is mounted like the tube 50 in Figure 7, and the amplifier is shown in the same relation to the tube and selecting circuit as in Figure 7ª. As regards the tube 107, the circuit 103, 104 is connected on the one hand to the plate 110, and on the other hand to the grid 111 by passing through the condenser 112 the grid being connected to the filament 113 by the resistance 114.

The plate 110 is also connected to the filament 113 by passing through the primary of a telephonic transformer 115 the secondary of which is branched into the telephone 116.

Under these conditions, the working of the primary selector circuit and of the vacuum tube 105 being the same as has been already explained, the self induction coil 100 is traversed by currents of low frequency and by currents of the secondary frequency from the emission of the arc 97 (see Figure 10). The circuits 101, 102, and 103, 104 respectively tuned to the secondary frequencies, (the circuit 101, 102 tuned to the frequency of the circuit 21, 17, 18 in Figure 10 and the circuit, 103, 104 to the frequency of the circuit 88, 96 in Figure 10) oscillate at the frequencies emitted by the vacuum tube 90 and the arc 97, respectively (see Figure 10).

In consequence of its method of connection the vacuum tube 107 emits local oscillations at a frequency approximating that of 103, 104 which, with the frequency induced in 103, 104 by 100, gives beats of an audible frequency. These beats being detected by 107 give an audible note in the telephone 116 which, however, ceases when the frequency of the oscillations from source 97 is changed by short circuiting at 98 (see Figure 10). This permits of the sending of radio-telegraphic signals.

The reception in the telephone 119 of the microphonic modulations is effected by the same mechanisms as in Figure 7.

The production of waves of high frequency modulated at a secondary frequency in the receiving circuits permitting of the use of the double selection may be carried out by various modifications of the circuit arrangements here shown both for the transmitting and receiving stations. The production of waves of high frequency, modulated at another high, but different frequency, may, of course, be accomplished in a variety of ways other than that shown herein in detail. It is obviously immaterial, for example, to the broader aspects of the invention whether the variation of the high frequency current at the secondary frequency is accomplished through the agency of a transformer coupling, as at 20 in Figure 1, or by other known connections for this purpose; nor is it essential that the variations be imposed upon the antenna circuit at any particular point. Likewise, the form of the generator, or other instrument for producing the oscillations, is immaterial; any known source of electrical variations of the proper frequency may obviously be employed. The ordinary spark transmitting station, if so operated that the wave trains succeed each other at an ultra-acoustic frequency, may be used in the exercise of this invention.

Currents suitable for the purposes herein described may likewise be produced directly by an alternator; either by an alternator with inductor coils the number of turns of which is variable and periodically varied, or by the excitation of a normal high frequency alternator by a generator of high frequency or lower frequency.

Figure 12:
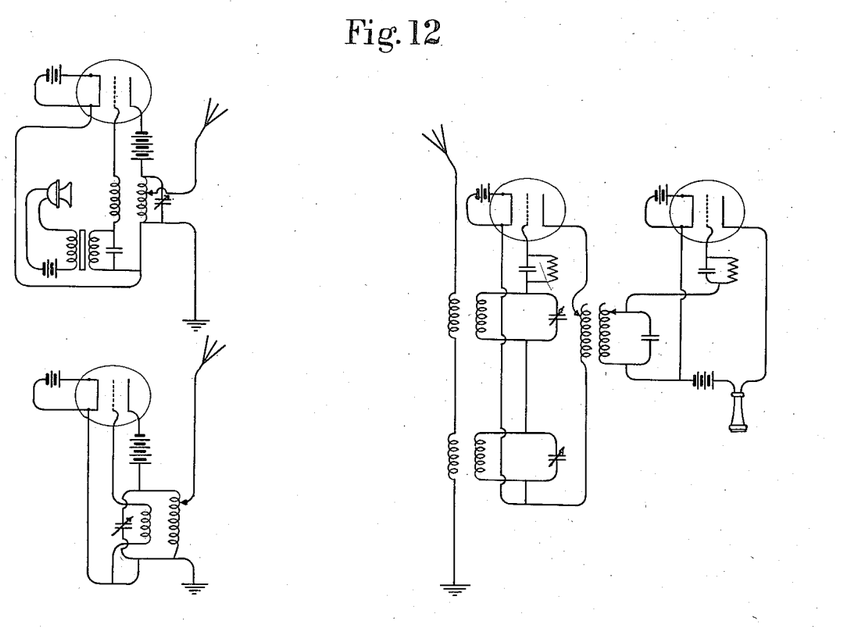
Figure 12 shows a modified systems for producing secondary frequency beats.

The invention may also be exercised by the use of beats of ultra-acoustic frequency produced between two different waves emitted either by the same station upon a single antenna, or by two distinct stations upon one or two antennæ with the use at the receiving station, either of a receiving circuit tuned simultaneously to the lengths of these two waves, or of two receiving circuits respectively tuned, one to each wave, and coupled to a third circuit in which the secondary frequency modulated by the low frequency current is produced. This arrangement is shown in Figure 12.

The different means proposed above permit of producing an emission current modulated to a secondary frequency, the modulation of which itself may be modulated and so on.

The use of this current permits of as many selections of the frequencies of modulations as there are successive modulations.

When several successive selections are employed, the frequencies of modulation may become acoustical in the selecting circuits starting from the 3rd.

In these arrangements use is made, if there is need of $x^1$ frequencies of modulation, of $x$ selecting circuits each followed by its detecting circuit, the first of these selecting circuits being tuned to the frequency of the waves received, the others to the successive frequencies of modulation taken in inverse order of the order of transmission.

It is likewise possible to impose on any one of the modulations several simultaneous frequencies of modulation N in number; in this case, there is employed at the stage of the reception corresponding to the said frequencies N oscillating circuits coupled to the circuits of the detector and tuned respectively to each of the simultaneous frequencies of modulation. It is possible to actuate in the same conditions N series of receiving apparatus absolutely independently of each other. An example has also been given (see Figures 10 and 11) of the application of these arrangements for simultaneous modulations in radio telegraphy and radio telephony.

The receiving appliances with double selection, which have been previously described, may likewise be utilized for the reception of sustained waves of the ordinary kind, that is to say not modulated at the secondary high frequency at the transmitting station, for the purpose of eliminating atmospheric currents and interfering stations with damped waves. In this case however the selection may not be always absolute.

For this purpose, the arrangement shewn in Figure 7 is completed by the addition thereto of a first local generator of sustained waves sending currents into the self induction coil 65 shewn in dotted lines and coupled magnetically to the self induction coil 29. The high frequency of these currents is such that it gives ultra acoustic beats of high frequency with the sustained wave of the emission to be received, this result is obtained by variation of the frequency induced by the local generator.

The current resulting from the superposition of the local current due to the induction of the self induction coil 65, upon the current received from the sustained waves transmitting station, gives into the oscillating circuit 29, 30 a high frequency current modulated at the ultra-acoustical frequency of the beats and similar to the currents previously described. It is possible to apply to this current the selective methods previously indicated in the case of the radio telegraphic transmissions.

A second local source 64, indicated in Figure 7 in dotted lines, may also be used, when desired, for the production of signals in the telephone 57 by the well-known homodyne or heterodyne method.

All the sustained wave stations emitting waves on the adjacent frequencies will likewise give beats of a high secondary frequency, but these are eliminated by the secondary selection.

Stations with damped emissions and very damped atmospheric currents will give by a suitable choice of the frequency of emission from the first local station and the time constants of the detecting circuits, a single beat caused by the short duration of the train of waves. After primary detection, the single period resulting from this beat, if the coupling of the secondary selector is sufficiently loose has little action on the oscillating circuit of this latter. There will not however generally be any vibrations with the second local transmitting station. This latter permits therefore of a sufficient selection of the sustained waves.

It should be noted that in the particular case where the continuous tension of the generator of emission (i. e., the high frequency generator) is lower than the alternating tension of the secondary frequency and in particular if it is zero, the energy emitted annuls itself during a portion of the period.

Figure 13:
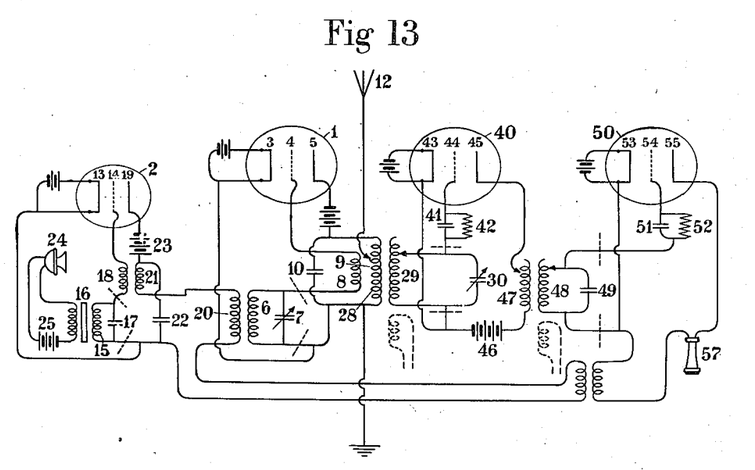
Figure 13 shows a duplex system.

This last described form of emission permits not only of a double selection at the receiving station but has the advantage of permitting comunications in duplex in a simple manner, by virtue of the fact that the interruptions of the emission at the secondary frequency are at a high rate. For this purpose each of the stations is at once and simultaneously a transmitting and receiving station and comprises for example the whole of a transmitting station such as shewn in Figure 1, and of a receiving station as shewn in Figure 7; the plate of the vacuum tube 50 will then be supplied by the modulating current of secondary frequencies from the contiguous transmitting station by replacing the battery 56 by a self induction coil coupled to the circuit 21, 22, 20, so that the said tube only acts as a detector in the alternate periods when the emission does not take place. This arrangement is shown in Figure 13.

It is also possible to employ for the constitution of this duplex transmitting and receiving station the appliances shewn in Figures 10 and 11 or any other appliance capable of emitting the current specified above.

The proposed system presents in particular the following advantages.

1. The complete elimination of parasites and ordinary stations and consequently affords the possibility of profiting by all the advantage of the amplifiers, particularly these of high frequency which may be interposed before the first selection and after each detection.

2. The simultaneous reception without confusion from several transmitting stations and transmitting on the same wave length with different frequencies of modulation, or several telegraphic or telephonic transmissions simultaneously from one and the same wireless telegraphy transmitting station.

3. The possibility of making a certain number of successive selections, the last selections being capable of being made on acoustical frequencies of modulation.

4. The receiving appliances with double selection above described may likewise be applied to the reception from transmitting stations with sustained waves and procure a notable improvement of the selection.

5. By reason of the complete insensibility of the system to the action of atmospheric parasites or other disturbances and to freedom from confusion with other stations of the simultaneous of its lines of transmission and of the secrecy of the communications, the present system lends itself to numerous applications in telemechanics and in particular to printing telegraphs with or without wires or of large output. As applications may be cited in particular the application of the different frequencies of modulation to the transmission by a Bandot transmitter, each key of the transmitting keyboard controlling a different frequency of modulation; or again the communication by a Hughes instrument.

6. The carrying out of communications of high efficiency whatever be the state of the atmosphere with automatic or printing apparatus with reduced transmission powers and with the advantage that the modulating power on which the manipulation is effected may be much less than the power oscillating in the transmitting circuits.

7. The application of the present invention permits of wireless telephony in secret with multiple and simultaneous conversations over long distances.

8. Its importance from the point of view of national defence seems great given the multiplicity of communications possible without mutual confusion which is fundamental in view of the great number of stations transmitting simultaneously in the front.

The arrangements above described particularly for the constitution of the transmitting station have been described with a view to the production of currents of high frequency modulated to high frequency but lower than the frequency of emission; these same arrangements might, in certain applications, be utilized for the production of currents possessing powerful harmonics and permitting, at the receiving station of the use of selecting appliances tuned to an ultra acoustical frequency different from the frequency of emission.

Claims:

1. The method of amplifying and receiving high frequency electrical oscillatory energy which comprises, combining the incoming energy with locally generated high frequency continuous oscillations of a frequency differing from said incoming energy by a third readily-amplifiable high frequency, converting the combined energy by suitable means to produce said readily-amplifiable high frequency oscillations, amplifying the said third high frequency oscillations, and detecting and indicating the resulting amplified oscillations.

2. The method of amplifying and receiving high frequency electrical oscillatory energy which comprises, combining the incoming energy with locally generated high frequency continuous electrical oscillations of a frequency differing from said incoming energy by a third readily-amplifiable high frequency, rectifying the combined energy to produce said readily-amplifiable high frequency oscillations, amplifying the said third high frequency oscillations, and detecting and indicating the resulting amplified oscillations.

3. The method of amplifying and receiving high frequency damped wave oscillatory electrical energy which comprises, combining the incoming energy with locally generated high frequency continuous electrical oscillations of a frequency differing from said incoming energy by a third readily-amplifiable high frequency, converting the combined energy by suitable means to produce said readily-amplifiable high frequency oscillations, amplifying the said third high frequency oscillations and detecting and indicating the resulting amplified oscillations.

4. The method of amplifying and receiving electrical oscillatory energy of short wave length which comprises combining the incoming energy with locally generated high frequency continuous electrical oscillations of a frequency differing from said incoming energy by a third high frequency within the range of 20,000 to 250,000 cycles per second, rectifying the combined energy to produce said oscillations of said third high frequency, amplifying the said third high frequency oscillations and detecting and indicating the resulting amplified oscillations.

5. The method of receiving and amplifying high frequency oscillations whereby the incoming energy is utilized to produce oscillations of a different locally predetermined high frequency which are then amplified and the resultant energy utilized to produce oscillations of a second different, locally predetermined, high frequency, which are then amplified, detected and indicated.

6. The method of receiving and amplifying high frequency currents whereby the incoming oscillations are combined with a second locally generated high frequency oscillations, and the combination converted by suitable means to produce oscillations of a third high frequency, which are then amplified and the resulting energy combined with a fourth locally generated high frequency oscillations and the combination converted by suitable means to produce oscillations of a fifth high frequency, which are then amplified, detected and indicated.

7. The method of receiving and multi-stage amplifying high frequency oscillations whereby the incoming energy is utilized to produce oscillations of a different locally predetermined high frequency, which are then amplified and the resultant energy utilized to produce successive oscillations of different high frequency, which are locally predetermined and amplified before being combined with successively different locally generated oscillations and converted to produce the successive oscillations and which after the last stage of amplification are then detected and indicated.

8. In a radio receiving system having a circuit selective for a predetermined frequency or frequencies, the method of receiving which consists in impressing the desired radio frequencies together with undesired frequencies upon a circuit which transmits over a range of frequencies wide as compared with the width of a signal band, variably translating the desired radio frequencies until a frequency or set of frequencies is obtained corresponding to that to which the selective circuit is selective, and detecting a signal from the translated and selected frequency or frequencies.

9. In a radio receiving system having a circuit selective for a predetermined frequency or band of frequencies, the method of receiving which consists in impressing the desired radio frequencies together with undesired frequencies upon a circuit which transmits a range of frequencies wide as compared with the width of a signal band, variably stepping down the desired radio frequency or frequencies until the frequency is obtained to which the selective circuit is selective, and detecting a signal from the stepped down and selected frequency.

10. In a radio receiving system having a circuit selective at an invariable frequency or band of frequencies, the method of receiving which consists in impressing upon a circuit, which transmits a range of frequencies wide as compared with the width of a signal band, the desired radio frequencies together with undesired frequencies, modifying said frequencies in accordance with currents having a frequency which is varied until a frequency or band of frequencies is obtained equal to the difference between the desired radio frequency or band of frequencies and the invariable frequency or band of frequencies to which said circuit is selective, thereby translating the desired frequencies into those to which the selective circuit is selective, and detecting a signal from the stepped down frequency or frequencies selected by the selective circuit.

11. In a radio receiving system having a circuit selective at an invariable frequency or band of frequencies, the method of receiving which consists in impressing the desired radio frequency or frequencies, together with undesired frequencies upon a circuit, which transmits a range of frequencies wide as compared with the width of a signal band, beating said frequencies with another frequency until there is obtained, among other components, a frequency or band of frequencies resulting from the desired radio frequency or frequencies and corresponding to that to which said selective circuit is selective, and detecting a signal from such resultant frequency after selection.

12. In a radio signaling system having a sharply selective and invariable receiving circuit, the method which consists in impressing upon a substantially aperiodic circuit a desired radio frequency or frequencies together with undesired frequencies, beating said frequencies with another current component, varying the frequency of said other component to produce a resultant frequency or band of frequencies from the desired radio frequency corresponding to those to which said receiving circuit is sharply selective, impressing the desired resultant frequency upon said circuit and detecting a signal from the frequency selected by said sharply tuned circuit.

13. A carrier wave transmission system comprising selective means for receiving a desired radio frequency, a local source of high frequency energy, means for combining the received energy and the energy of the local source to produce an intermediate frequency lower than the received frequency but above audibility, a second local source of alternating current energy, and a detector for combining the intermediate frequency energy and the energy of said second local source to produce signals and an electrical filter connected at one end to a circuit containing the intermediate frequency and at the other end to said detecting means.

14. A carrier wave transmission system comprising an antenna, means for producing high frequency oscillations in said antenna, a source of intermediate frequency oscillations above audibility arranged to modulate said high frequency oscillations, means for modulating said intermediate frequency oscillations in accordance with signals, a receiving circuit connected to said antenna including a detector having input and output circuits, connections for supplying the output circuit of said detector with energy from said intermediate frequency source, the tension of the intermediate frequency source being higher than that of the said high frequency source whereby the transmission of signals from said antenna is interrupted at an inaudible frequency, during which interruptions the receiving circuit is operative.

15. A carrier wave signal transmitting system comprising an adjustable tuned circuit for receiving incoming high frequency energy, said circuit being designed to pass all frequencies necessary to the desired signal, means for reducing the received energy to lower frequencies above audibility while retaining the signal modulations thereon, a filter circuit connected to receive the energy of said lower frequencies and designed to pass with substantially negligible attenuation all frequencies within the desired signal band and to substantially eliminate all other frequencies, and means connected to the output of said filter circuit for detecting the energy transmitted by said filter circuit.

16. In a receiver for carrier wave transmitting systems, a circuit sharply selective to a fixed band of frequencies intermediate the carrier frequency and the signal frequency and which is designed to pass with substantially uniform and negligible attenuation all frequencies within said band and substantially to suppress all other frequencies, a circuit which may be variably tuned to a desired incoming frequency but adapted to pass all frequencies necessary to the desired signal, means for imposing the incoming energy upon said tuned circuit, means for reducing the incoming energy in said tuned circuit to lower frequencies and adjusting said lower frequencies so that the desired signal energy shall occupy the band of intermediate frequencies for which said sharply selective circuit is set, connections for applying the lower frequency energy to the sharply selective circuit and means connected with the output of said sharply selective circuit for detecting the desired signals from said intermediate frequencies so selected.

17. In a carrier wave signal system, a selective circuit upon which the incoming signaling energy is imposed, means for amplifying impulses produced in said circuit, a second circuit selective to the same frequency connected to the output of said amplifying means, means for reducing the energy from said second selective circuit to lower frequency impulses carrying the signal variations, means for amplifying the impulses of said lower frequency and means for detecting the energy output of said last named amplifying means.

The foregoing specification of my improvements in electrical transmission of energy signed by me this twenty-third day of July, 1918.

LUCIEN LEVY.